US012399987B1

(12) United States Patent
Jakobsson

(10) Patent No.: US 12,399,987 B1
(45) Date of Patent: Aug. 26, 2025

(54) PERFORMING AUTHENTICATION

(71) Applicant: RavenWhite Security, Inc., Menlo Park, CA (US)

(72) Inventor: Bjorn Markus Jakobsson, New York, NY (US)

(73) Assignee: Raven White Security, Inc., Menlo Park, CA (US)

( * ) Notice: Subject to any disclaimer, the term of this patent is extended or adjusted under 35 U.S.C. 154(b) by 0 days.

(21) Appl. No.: 19/011,897

(22) Filed: Jan. 7, 2025

Related U.S. Application Data

(63) Continuation of application No. 18/763,760, filed on Jul. 3, 2024, now abandoned, which is a continuation of application No. 17/592,209, filed on Feb. 3, 2022, now Pat. No. 12,058,140, which is a continuation of application No. 16/997,174, filed on Aug. 19, 2020, now Pat. No. 11,277,413, which is a continuation of application No. 16/048,082, filed on Jul. 27, 2018, now Pat. No. 10,791,121, which is a continuation of application No. 14/325,239, filed on Jul. 7, 2014, now Pat. No. 10,079,823, which is a continuation of
(Continued)

(51) Int. Cl.
G06F 21/55 (2013.01)
G06F 21/00 (2013.01)
G06F 21/31 (2013.01)
H04L 9/08 (2006.01)
H04L 9/40 (2022.01)

(52) U.S. Cl.
CPC ............ *G06F 21/554* (2013.01); *G06F 21/00* (2013.01); *G06F 21/31* (2013.01); *G06F 21/552* (2013.01); *H04L 9/0891* (2013.01); *H04L 63/083* (2013.01); *H04L 63/102* (2013.01); *H04L 63/107* (2013.01); *H04L 63/1483* (2013.01); *H04L 63/18* (2013.01); *G06F 2221/2131* (2013.01); *H04L 2209/56* (2013.01); *H04L 2209/605* (2013.01); *H04L 2209/805* (2013.01)

(58) Field of Classification Search
CPC .................................................... G06F 21/554
See application file for complete search history.

(56) References Cited

U.S. PATENT DOCUMENTS 5,446,895 A * 8/1995 White ............... G06Q 99/00
717/107
5,704,017 A 12/1997 Heckerman
(Continued)

FOREIGN PATENT DOCUMENTS

WO WO03034633 4/2003

OTHER PUBLICATIONS

Agrawal, "Privacy-Preserving Data Mining", Jan. 1, 2000, ACM SIGMOD Conference on Management of Data (2000), ACM Press, pp. 439-450.
(Continued)

*Primary Examiner* — Bradley W Holder
(74) *Attorney, Agent, or Firm* — Michael Haynes PLC; Michael N. Haynes

(57) ABSTRACT

Preference data is received. The received preference data is compared to stored preference data associated with a user with which the received preference data is associated. A determination is made whether to authorize an action based at least on the comparison. The preference data is received as a selection.

14 Claims, 6 Drawing Sheets

Related U.S. Application Data application No. 12/215,048, filed on Jun. 23, 2008, now Pat. No. 8,844,003, which is a continuation-in-part of application No. 11/890,408, filed on Aug. 6, 2007, now abandoned.

(60) Provisional application No. 60/967,675, filed on Sep. 6, 2007, provisional application No. 60/918,781, filed on Mar. 19, 2007, provisional application No. 60/836,641, filed on Aug. 9, 2006.

(56) References Cited

U.S. PATENT DOCUMENTS

| | | |
|---|---|---|
| 5,721,781 A | 2/1998 | Deo |
| 5,978,475 A | 11/1999 | Schneier |
| 5,991,882 A | 11/1999 | O'Connell |
| 6,035,406 A | 3/2000 | Moussa |
| 6,108,706 A | 8/2000 | Birdwell |
| 6,385,596 B1 | 5/2002 | Wiser |
| 6,421,453 B1 | 7/2002 | Kanevsky |
| 6,496,936 B1 | 12/2002 | French |
| 6,766,319 B1 | 7/2004 | Might |
| 6,965,948 B1 | 11/2005 | Eneborg |
| 7,024,690 B1 | 4/2006 | Young |
| 7,095,850 B1 | 8/2006 | McGrew |
| 7,152,165 B1 | 12/2006 | Maheshwari |
| 7,310,733 B1 | 12/2007 | Pearson |
| 7,509,290 B1 | 3/2009 | McKee |
| 7,698,442 B1 | 4/2010 | Krsihnamurthy |
| 7,792,738 B2 | 9/2010 | Channell |
| 7,800,534 B1 | 9/2010 | Yenney |
| 7,861,287 B2 | 12/2010 | Pomerantz |
| 7,930,735 B2 | 4/2011 | Vigelette |
| 7,979,908 B2 | 7/2011 | Millwee |
| 8,069,484 B2 | 11/2011 | McMillan |
| 8,078,881 B1 | 12/2011 | Liu |
| 8,086,533 B1 | 12/2011 | Maglaque |
| 8,102,253 B1 | 1/2012 | Brady |
| 8,453,222 B1 | 5/2013 | Newstadt |
| 8,869,243 B2 | 10/2014 | McGeehan |
| 2002/0023221 A1* | 2/2002 | Miyazaki ............... G06F 21/64 713/178 |
| 2002/0026345 A1 | 2/2002 | Juels |
| 2002/0031230 A1 | 3/2002 | Sweet |
| 2002/0062268 A1 | 5/2002 | Sato |
| 2002/0169865 A1 | 11/2002 | Tarnoff |
| 2003/0131256 A1 | 7/2003 | Ackroyd |
| 2003/0145224 A1 | 7/2003 | Bailey |
| 2003/0154406 A1 | 8/2003 | Honarvar |
| 2003/0194094 A1 | 10/2003 | Lampson |
| 2003/0212800 A1 | 11/2003 | Jones |
| 2003/0225707 A1 | 12/2003 | Ehrman |
| 2003/0236992 A1 | 12/2003 | Yami |
| 2004/0054908 A1* | 3/2004 | Circenis ............... G06F 21/10 713/176 |
| 2004/0083390 A1 | 4/2004 | Cuenod |
| 2004/0111621 A1 | 6/2004 | Himberger |
| 2004/0123116 A1 | 6/2004 | Jin |
| 2004/0123162 A1 | 6/2004 | Antell |
| 2004/0186813 A1 | 9/2004 | Tedesco |
| 2004/0189441 A1 | 9/2004 | Stergiou |
| 2004/0255150 A1 | 12/2004 | Sezan |
| 2005/0076384 A1 | 4/2005 | Upendran |
| 2005/0091492 A1* | 4/2005 | Benson ............... G06Q 20/04 713/170 |
| 2005/0097320 A1 | 5/2005 | Golan |
| 2005/0097364 A1 | 5/2005 | Edecki |
| 2005/0128989 A1 | 6/2005 | Bhagwat |
| 2005/0166065 A1 | 7/2005 | Eytchison |
| 2006/0036857 A1 | 2/2006 | Hwang |
| 2006/0123092 A1 | 6/2006 | Madams |
| 2006/0123478 A1 | 6/2006 | Rehfuss |
| 2006/0178918 A1 | 8/2006 | Mikurak |
| 2006/0225136 A1 | 10/2006 | Rounthwaite |
| 2006/0235764 A1 | 10/2006 | Bamborough |
| 2006/0258368 A1 | 11/2006 | Granito |
| 2006/0282660 A1 | 12/2006 | Varghese |
| 2006/0293921 A1 | 12/2006 | McCarthy |
| 2007/0005967 A1 | 1/2007 | Mister |
| 2007/0016951 A1 | 1/2007 | Piccard |
| 2007/0022300 A1 | 1/2007 | Eppert |
| 2007/0039038 A1 | 2/2007 | Goodman |
| 2007/0081667 A1 | 4/2007 | Hwang |
| 2007/0179848 A1 | 8/2007 | Jain |
| 2007/0261109 A1 | 11/2007 | Renaud |
| 2007/0277224 A1 | 11/2007 | Osborn |
| 2009/0055910 A1 | 2/2009 | Lee |
| 2009/0094164 A1 | 4/2009 | Fontaine |
| 2009/0119763 A1 | 5/2009 | Park |
| 2009/0150986 A1 | 6/2009 | Foreman |
| 2009/0245572 A1 | 10/2009 | Redlich |
| 2009/0254971 A1 | 10/2009 | Herz |
| 2009/0319274 A1 | 12/2009 | Gross |
| 2010/0030578 A1 | 2/2010 | Siddique |
| 2010/0031330 A1 | 2/2010 | Von Ahn |
| 2010/0122341 A1 | 5/2010 | Golle |
| 2012/0011567 A1 | 1/2012 | Cronk |
| 2013/0117813 A1 | 5/2013 | Yudkin |
| 2015/0334077 A1 | 11/2015 | Feldman |
| 2016/0021105 A1 | 1/2016 | Pellom |

OTHER PUBLICATIONS

Author Unknown, "ActiveX Spyware & Adware Scanning, Spywareinfo", Oct. 9, 2006, Online Spyware Detection, http://www.spywareinfo.com/xscan.php.

Bellare, "A Forward-Secure Digital Signature Scheme", Dec. 16, 1999, Michael Wiener (Ed.): CRYPTO'99, LNCS 1666, pp. 431-448.

Bellare, "Forward Integrity for Secure Audit Logs", Nov. 23, 1997, Technical Report, University of California of San Diego, Dept. of Computer Science & Engineer., pp. 1-16.

Bellare, "Forward-Security in Private-Key Cryptography, in CT-RSA", Jan. 1, 2003, Springer-Verlag, LNCS No. 2612, pp. 1-18.

Benaloh, "Efficient Broadcast Time-Stamping (Extended Abstract)", Apr. 21, 1992, Clarkson University, Potsdam, New York.

Buldas, "On Provably Secure Time-Stamping Schemes", Jan. 1, 2004, International Conference on the Theory and Application of Cryptology and Information Security. Berlin, Heidelberg: Springer Berlin Heidelberg, 2004.

Buldas, "Optimally Efficient Accountable Time-Stamping", Jan. 1, 2000, International workshop on public key cryptography. Berlin, Heidelberg: Springer Berlin Heidelberg, 2000.

Buldas, "Universally Composable Time-Stamping Schemes with Audit", Sep. 20, 2005, Information Security: 8th International Conference, ISC 2005, Singapore, Sep. 20-23, 2005. Proceedings 8. Springer Berlin Heidelberg, 2005.

Chong, "Secure Audit Logging with Tamper-Resistant Hardware", Jan. 1, 2003, Security and Privacy in the Age of Uncertainty. SEC 2003. IFIP—The International Federation for Information Processing, vol. 122. Springer, Boston, MA. https://doi.org/10.1007/978-0-387-35691-4_7.

Chun, "Attested Append-Only Memory: Making Adversaries Stick to their Word", Oct. 14, 2007, SOSP'07, Oct. 14-17, 2007, Stevenson, Washington, USA.

Clover, "Timing Attacks on Web Privacy (Paper and Specific Issue),", Feb. 20, 2002, http://www.securiteam.com/securityreviews/5GP020A6LG.html.

Devanbu, "Authentic Data Publication Over the Internet", Jul. 1, 2003, Journal of Computer Security, vol. 11, No. 3, pp. 291-314, 2003.

Diffie, "Authentication and Authenticated Key Exchanges", Jan. 1, 1992, Designs, Codes and Cryptography, 2, pp. 107-125.

Felten, "Timing Attacks on Web Privacy", Jan. 1, 2000, ACM Conference on Computer and Communication Security (2000), ACM Press, pp. 25-32.

Gennaro, "How to Sign Digital Streams", Jan. 1, 2006, Advances in Cryptology—CRYPTO '97 (CRYPTO 1997), Conference paper First Online: Jan. 1, 2006 pp. 180-197.

(56) References Cited

OTHER PUBLICATIONS

Gunther, "An Identity-Based Key-Exchange Protocol,", Oct. 9, 2007, http://dsns.csie.nctu.edu.tw/research/crypto/HTML/PDF/E89/29 .PDF.

Haber, "How to Time-Stamp a Digital Document", Jan. 1, 1991, Journal of Cryptology, International Assoc. for Cryptologic Research, 3: 99-111.

Jin, "Key Evolution-Based Tamper Resistance: A Subgroup Extension", Jan. 1, 2007, In R.H. Deng and P. Samarati, editors, ACM ASIACCS.

Jin, "Towards Better Software Tamper Resistance", Jan. 1, 2005, In J. Zhou et al., editor, Information Security Conference, Springer, LNCS 3650, 3650, pp. 417-430.

Just, "Some Timestamping Protocol Failures", Mar. 12, 1998, In NDSS (vol. 98, pp. 89-96).

Kawaguchi, "Efficient log authentication for forensic computing", Jun. 1, 2005, Proceedings from the Sixth Annual IEEE SMC Information Assurance Workshop (pp. 215-223).

Kelsey, "An authenticated camera", Dec. 1, 1996, Proceedings 12th Annual Computer Security Applications Conference. IEEE, 1996, (pp. 24-30).

Krawczyk, "Simple Forward-Secure Signatures From Any Signature Scheme", Nov. 1, 2000, CCS '00: Proceedings of the 7th ACM conference on Computer and Communications Security pp. 108-115.

Maniatis, "Secure History Preservation through Timeline Entanglement", Aug. 5, 2002, Proceedings of the 11th USENIX Security Symposium, Aug. 5-9, 2002, San Francisco, CA, USA.

Rabkin, "Personal Knowledge Questions for Fallback Authentication: Security Questions in the Era of Facebook", Jan. 1, 2008, Symposium on Usable Privacy and Security (SOUPS), 2008.

Schneier, "Cryptographic Support for Secure Logs on Untrusted Machine", May 1, 1999, In USENIX Security Symposium, pp. 53-62,1998. Schneier et al., Secure Audit Logs to Support Computer Forensics, ACM Transactions on Information and System Security (TISSEC), 2(2), pp. 159-176.

Schneier, "Secure Audit Logs to Support Computer Forensics", May 1, 1999, ACM Transactions on Information and System Security (TISSEC), 2(2), pp. 159-176.

Snodgrass, "Tamper Detection in Audit Logs", Jan. 1, 2004, Proceedings of the Thirtieth international conference on Very large data bases—vol. 30. 2004.

Une, "The Security Evaluation of Time Stamping Schemes: The Present Situation and Studies", 2001, IMES Discussion Paper Series 2001-E-18, Bank of Japan.

Waters, "Building an Encrypted and Searchable Audit Log", Jan. 9, 2004, https://people.cs.georgetown.edu/~clay/classes/fall2014/papers/Building_an_Encrypted_and_Searchable_Audit_Log.pdf.

U.S. Appl. No. 11/890,408: Non-Final Office Action, Aug. 26, 2010.
U.S. Appl. No. 11/890,408: Response, Feb. 24, 2011.
U.S. Appl. No. 11/890,408: Final Office Action, Apr. 7, 2011.
U.S. Appl. No. 11/890,408: Response, Sep. 7, 2011.
U.S. Appl. No. 11/890,408: Non-Final Office Action, Oct. 17, 2011.
U.S. Appl. No. 11/890,408: Response, Mar. 19, 2012.
U.S. Appl. No. 11/890,408: Final Office Action, Apr. 24, 2012.
U.S. Appl. No. 11/890,408: Interview Summary & Office Action Appendix, Oct. 19, 2012.
U.S. Appl. No. 11/890,408: Response, Oct. 24, 2012.
U.S. Appl. No. 11/890,408: Non-Final Office Action, Nov. 9, 2012.
U.S. Appl. No. 11/890,408: Response, Feb. 11, 2013.
U.S. Appl. No. 11/890,408: Interview Summary, Feb. 13, 2013.
U.S. Appl. No. 11/890,408: Final Office Action, Apr. 4, 2013.
Random House Webster's Unabridged Dictionary Second Edition, 2001, Random House Inc., p. 2093. Definition of "upon".
Oxford English Dictionary, 2nd Edition (1989), vol. XIX, pp. 299, 301, Clarendon Press. Definition of "upon".

* cited by examiner

|  | Yes | No | Not Sure |
|---|---|---|---|
| 001. Do you like cats? ⟶302 | [X] | [ ] | [ ] |
| 002. Do you like anchovies? | [ ] | [X] | [ ] |
| 003. Do you like playing golf? | [ ] | [ ] | [X] |
| ... | | | |
| 120. Have you been to Chicago? ⟶304 | [ ] | [X] | [ ] |

FIG. 3A

On a scale of 1 (strongly dislike) – 5 (love), please rate the following:      1   2   3   4   5

01. Watching horror movies       ◯ ◯ ◯ ◯ ◯

02. Reading romance novels       ◯ ◯ ◯ ◯ ◯

03. Swimming in a lake           ◯ ◯ ◯ ◯ ◯

Please enter at least 10 items in each column

| Like | Dislike |
|---|---|
| Apples | Washing the car |
| BBQ | Spicy food |
| Playing the piano | Watching ice hockey |
| ... | Raw tomatoes |

FIG. 3C

| Sports | Activities | Food |
|---|---|---|
| TV | Places | Music |

402

404

| Museums | Like | Dislike |
|---|---|---|
| Bookstores | Like | Dislike |
| Garage sales | Like | Dislike |
| Raves | Like | Dislike |
| Political events | Like | Dislike |
| Flea markets | Like | Dislike |
| Art galleries | Like | Dislike |
| The opera | Like | Dislike |
| Libraries | Like | Dislike |
| Antique stores | Like | Dislike |

Likes
1.
2.
3.
4.
5.
6.
7.
8.

(Please choose 8 more)

Dislikes
1.
2.
3.
4.
5.
6.
7.
8.

(Please choose 8 more)

FIG. 4

ACME SITE | Help

Password Reset

To verify who you are, please indicate your preference for each of the items below:

| | Like | Dislike |
|---|---|---|
| Seafood | ○ | ○ |
| Going to garage sales | ○ | ○ |
| Going to libraries | ○ | ○ |
| Southwestern food | ○ | ○ |
| Watching golf | ○ | ○ |
| Going to the opera | ○ | ○ |
| Watching tennis | ○ | ○ |
| Vegetarian food | ○ | ○ |
| Going to museums | ○ | ○ |
| Watching soccer | ○ | ○ |
| Going to bookstores | ○ | ○ |
| Going to flea markets | ○ | ○ |
| Going to political events | ○ | ○ |
| Watching figure skating | ○ | ○ |
| Watching baseball | ○ | ○ |
| German food | ○ | ○ |

[Reset] [Done]

PERFORMING AUTHENTICATION

CROSS REFERENCE TO OTHER APPLICATIONS

This application is a continuation of U.S. patent application Ser. No. 17/592,209 entitled PERFORMING AUTHENTICATION filed Feb. 3, 2022 which is incorporated herein by reference for all purposes, which is a continuation of U.S. patent application Ser. No. 16/997,174 entitled PERFORMING AUTHENTICATION filed Aug. 19, 2020, now U.S. Pat. No. 11,277,413, which is incorporated herein by reference for all purposes, which is a continuation of U.S. patent application Ser. No. 16/048,082 entitled PERFORMING AUTHENTICATION filed Jul. 27, 2018, now U.S. Pat. No. 10,791,121, which is incorporated herein by reference for all purposes, which is a continuation of U.S. patent application Ser. No. 14/325,239 entitled PERFORMING AUTHENTICATION filed Jul. 7, 2014, now U.S. Pat. No. 10,079,823, which is incorporated herein by reference for all purposes, which is a continuation of U.S. patent application Ser. No. 12/215,048 entitled PERFORMING AUTHENTICATION filed Jun. 23, 2008, now U.S. Pat. No. 8,844,003, which is incorporated herein by reference for all purposes, which is a continuation-in-part of U.S. patent application Ser. No. 11/890,408 entitled METHOD AND APPARATUS FOR EVALUATING ACTIONS PERFORMED ON A CLIENT DEVICE filed Aug. 6, 2007, which is incorporated herein by reference for all purposes, which claims priority to U.S. Provisional Application No. 60/836,641 entitled METHOD AND APPARATUS FOR IMPROVED WEB SECURITY filed Aug. 9, 2006, which is incorporated herein by reference for all purposes, and claims priority to U.S. Provisional Application No. 60/918,781 entitled SECURE LOGGING OF CRITICAL EVENTS, ALLOWING EXTERNAL MONITORING filed Mar. 19, 2007, which is incorporated herein by reference for all purposes. U.S. patent application Ser. No. 12/215,048 also claims priority to U.S. Provisional Patent Application No. 60/967,675 entitled METHOD AND APPARATUS FOR LIGHT-WEIGHT AUTHENTICATION filed Sep. 6, 2007, which is incorporated herein by reference for all purposes.

BACKGROUND OF THE INVENTION

Authentication techniques are used to ensure that actions, for example accessing a computer or other resource, are performed only by an authorized human or other user. One way that websites and other electronic services authenticate their users is by requiring those users to supply a username and a valid password before being granted access. Typically the password is selected by the user the first time the user visits the site (e.g., as part of a registration process), and may be changed by the user as desired. Unfortunately, users sometimes forget their passwords-especially if the password is complex or used infrequently. Passwords can also be difficult to type, for example if the user is using a client with limited input capabilities.

BRIEF DESCRIPTION OF THE DRAWINGS

Various embodiments of the invention are disclosed in the following detailed description and the accompanying drawings.

FIG. 3A illustrates an embodiment of an interface for capturing preference information.

FIG. 3B illustrates an embodiment of an interface for capturing preference information.

FIG. 3C illustrates an embodiment of an interface for capturing preference information.

FIG. 4 illustrates an embodiment of an interface for capturing preference information.

FIG. 6 illustrates an embodiment of an interface for authenticating a user.

DETAILED DESCRIPTION

Figure 1:
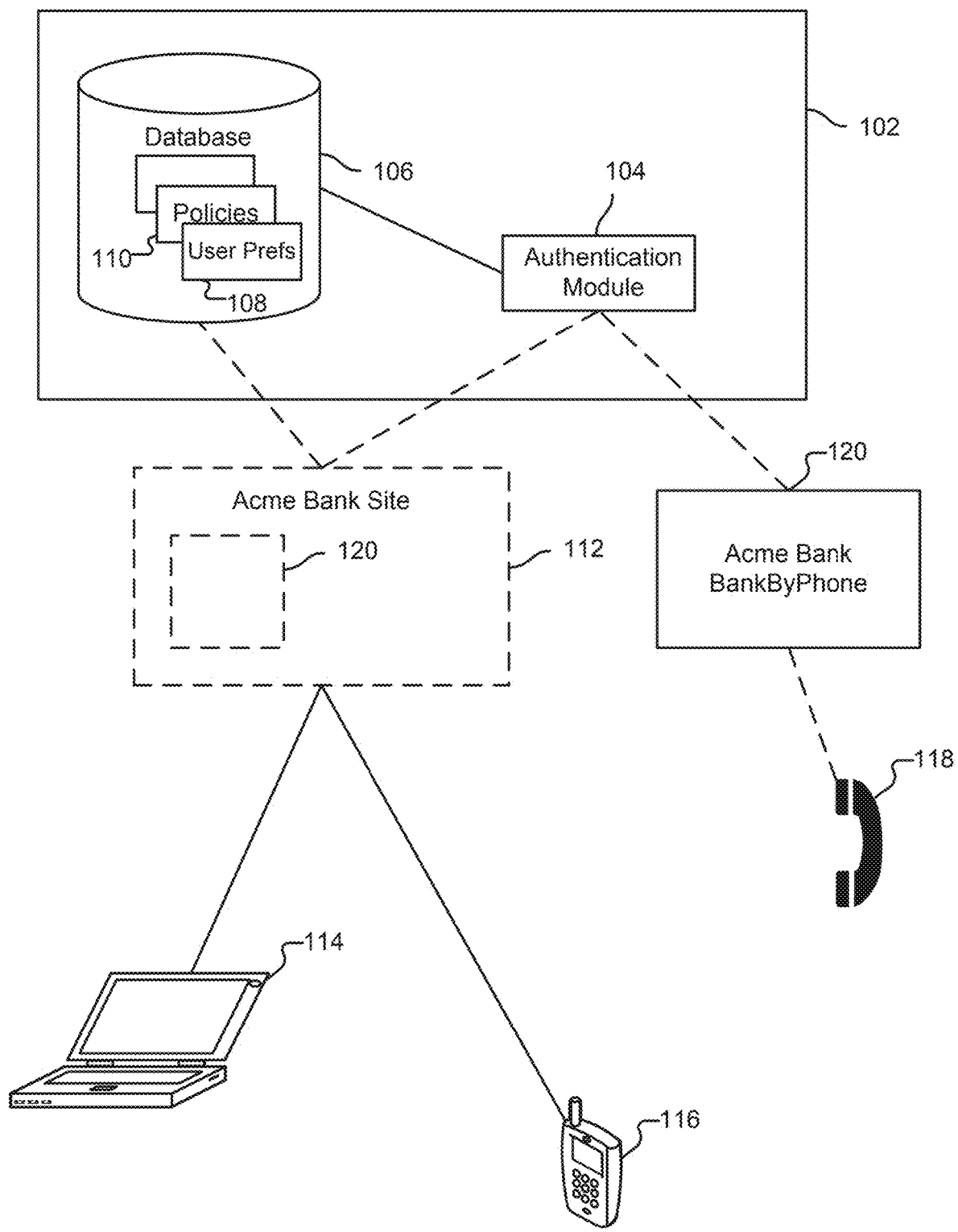
FIG. 1 illustrates an embodiment of an environment in which authentication is provided.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Those who control access to computer or other resources commonly use automated techniques to verify the identity of a person or other user attempting to take an action with respect to the resource, such as accessing account or other information, performing an operation, etc. For example, if a user is unable to remember his or her password, that user typically can request that the password be reset via an automated process by which the identity of the user is attempted to be verified. Assorted schemes exist that attempt to determine whether a particular reset request has been submitted by a legitimate user that has genuinely forgotten his or her password or by a nefarious individual attempting to gain unauthorized access to an account. Unfortunately, some such schemes can be vulnerable to data-mining (e.g., asking for a mother's maiden name or county in which the user owns property, both of which can be obtained from public records). Other schemes can be vulnerable to guessing (e.g., requiring the user to supply answers to a series of questions at enrollment time such as "what is the name of your pet?" for which there are common responses). If questions attempting to elicit less common responses are used (e.g., "what is the name of your grade school teacher?") a risk exists that a legitimate user will, in addition to forgetting the password, also forget the information needed to complete a password reset action. Other schemes, such as requiring that the user call a help desk for assistance can be expensive, and can also be subject to social engineering on the part of an attacker. If the user maintains a personal website or makes use of social networking sites, an attacker potentially has even more information to mine (e.g., for pet names, names of friends, former addresses etc.) and thus may have an even easier time gaining unauthorized access to the legitimate user's account.

As described in more detail below, using the techniques disclosed herein, a series of preferences, such as whether an individual likes onions and whether an individual listens to reggae music are used to help determine whether a request has been submitted by a legitimate user or by an attacker. In various embodiments, additional information is used to augment the preference information supplied by the user. The techniques described herein can be used as a secondary form of authentication (e.g., for when the user has forgotten or is otherwise unable to supply an existing password) and can also be used as a primary form of authentication (e.g., instead of a traditional password, PIN, or other credential), as applicable.

FIG. 1 illustrates an embodiment of an environment in which authentication is provided. In the example shown, a user (hereinafter referred to as "Alice") maintains several bank accounts with Acme Bank. Alice banks with Acme Bank, both at typical branch offices, and also online, by visiting Acme Bank's website 112. Alice connects to website 112 using her laptop 114 and on occasion also uses her mobile phone 116 to perform tasks such as checking her account balances. In various embodiments, other types of clients (not shown) are used to communicate with website 112, such as personal digital assistants, set-top boxes, game consoles, etc. In addition to (and/or instead of) websites, such as website 112, the techniques described herein may also be used in conjunction with other electronic environments, such as those providing authentication to intranet services, network appliances, game servers, etc.

The first time Alice decides to avail herself of Acme Bank's online banking features, she visits website 112 and commences an enrollment process. She is asked to choose a username and supply information such as her full name, phone number, and bank account numbers. She is also asked to select a password. As described in more detail below, she is also asked to provide additional information (e.g., her preferences for assorted things) for use in the event she ever forgets her password or is otherwise unable to authenticate herself using her selected password.

In the example shown in FIG. 1, authentication module 104 is configured to capture information at the time of Alice's enrollment and store that information in database 106, for example, as a set of preferences 108 associated with Alice. Database 106 also stores other information, such as policies 110 to be used by authentication module 104 when determining whether to grant Alice access to banking resources on subsequent visits and/or when determining whether Alice should be permitted to reset or recover her password in the event that she later forgets it. Other data structures may also be used to store preferences 108 and/or policies 110 as applicable.

System 102 provides authentication services for website 112. System 102 also provided authentication services for Acme's bank by phone tool 120, which allows customers to check their account balances and perform other actions via conventional telephone 118. In various embodiments, system 102 and website 112 are maintained by two different entities. For example, a website hosting company might maintain website 112 under a contract with Acme Bank, while another entity maintains authentication system 102. Similarly, when Alice visits website 112, a portion of the content rendered in her browser may be served by the web hosting company, while another portion of the content (120) may be served by system 102.

In various embodiments, the infrastructure provided by portions of authentication system 102 is located on and/or replicated across a plurality of servers rather than the entirety of authentication system 102 being collocated on a single platform. Such may be the case, for example, if the contents of database 106 are vast and/or if system 102 is used to provide authentication services to multiple websites 112 and/or other electronic resources not shown. Similarly, in some embodiments the serving of content such as website 112 is provided by system 102, rather than being provided by a separate system (e.g., provided by a web hosting company). Whenever authentication system 102 performs a task (such as receiving information from a user, authenticating the user, etc.), either a single component or a subset of components or all components of authentication system 102 may cooperate to perform the task.

Figure 2:
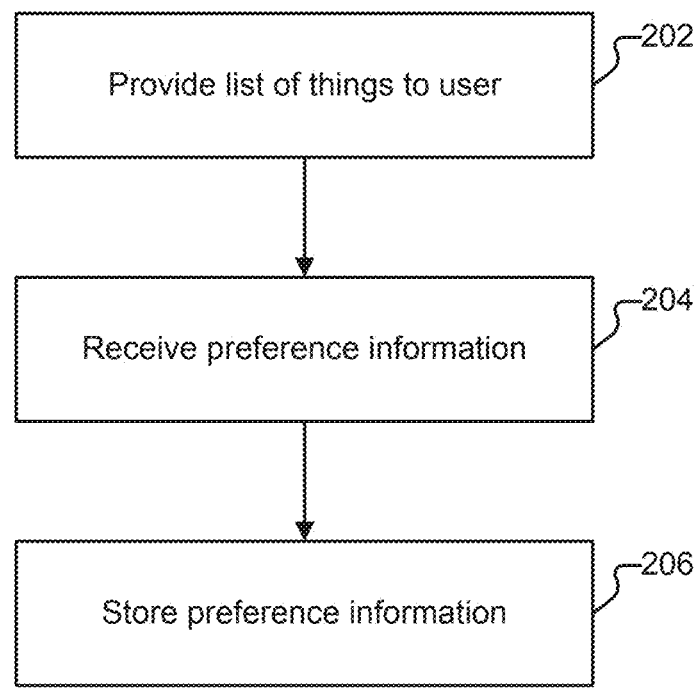
FIG. 2 is a flow chart illustrating an embodiment of an enrollment process.

FIG. 2 is a flow chart illustrating an embodiment of an enrollment process. In various embodiments, the process shown in FIG. 2 is performed by system 102. The process begins at 202 when a list of things (e.g., such as food items and styles of music) is provided to a user. At 204, preference information associated with at least some of the things is received from the user. At 206, preference information associated with the user is stored. In some embodiments portions of the process shown in FIG. 2 are repeated. For example, items may be provided to a user in batches, and corresponding batches of preference information are received and stored as appropriate. In some embodiments, batches of preference information are received/stored in conjunction with a later authentication attempt, when the user has gained access to his or her account, and/or when the user otherwise lets his or her preferences be known to the system.

FIG. 3A illustrates an embodiment of an interface for capturing preference information. In some embodiments the interface shown in FIG. 3A is used in conjunction with the process shown in FIG. 2. Items 302 are presented to a user (e.g., at 202), such as Alice, at enrollment time, such as via website 112. Alice indicates her preferences (if any) for each item by selecting the checkbox that corresponds to her preference. In some embodiments a default preference of "not sure" or "no opinion" is checked. While in the example shown in FIG. 3A a total of 120 questions are shown as being presented, in various embodiments more, fewer, and/or a variable and/or dynamically and/or randomly determined number of questions are presented at enrollment, depending on such factors as the degree of certainty and/or security required, the nature and/or value of the resource(s) being protected, the quality, reliability, etc. of the particular questions presented, etc.

In the example shown in FIG. 3A, Alice has indicated that she likes cats, that she does not like anchovies, and that she is unsure of whether she likes playing golf. After making all of her selections, Alice submits her preferences to system 102 (e.g., at 204). System 102 stores Alice's preferences, e.g., in database 108 for later use.

Item 304 ("have you been to Chicago?") is an example of a life question, included in some embodiments to augment the preference information collected from the user, and described in more detail below.

FIG. 3B illustrates an embodiment of an interface for capturing preference information. In some embodiments the interface shown in FIG. 3B is used in conjunction with the process shown in FIG. 2. As used herein, preference information for a thing includes information that describes how a particular user feels about that thing. Preference information can be positive (e.g., "I like cats"), negative (e.g., "I don't like anchovies"), and neutral (e.g., "I don't know if I like playing golf"). In some embodiments a Likert scale is used to collect and preference information. For example, in the interface shown in FIG. 3B, instead of answering yes or no questions, users are requested to rate their preferences for items on a five point scale, with 1 indicating a strong dislike, 3 indicating a neutral opinion, and 5 indicating a strong like of an item. Other expressions of preferences, such as expressions of habit, can also be input in a similar manner.

FIG. 3C illustrates an embodiment of an interface for capturing preference information. In some embodiments the interface shown in FIG. 3C is used in conjunction with a portion of the process shown in FIG. 2. In the example shown, rather than providing users with items, users are asked to supply their own list of items and corresponding preferences. Portion 202 of the process shown in FIG. 2 is omitted accordingly.

FIG. 4 illustrates an embodiment of an interface for capturing preference information. In some embodiments the interface shown in FIG. 4 is used in conjunction with the process shown in FIG. 2. In the example shown, users are asked to select a category 402. Items belonging to the selected category are then displayed to the user in region 404. Users are requested to select a total of eight liked items and eight disliked items from region 404, and are permitted to switch between categories 402 (causing different items to be displayed in region 404) to arrive at a total of 16 preferences for 16 items. Typically, most users are neutral about most topics. By using the interface shown in FIG. 4, users can avoid having to repeatedly mark items as "no opinion."

It is typically easier for people to remember preferences (e.g., "I like mushrooms") than arbitrary information such as a password. Additionally, one typical goal of service providers is to permit legitimate users to correctly answer authenticating information while at the same time making it unlikely for illegitimate users to correctly do so. In some embodiments the items for which a user's preference is solicited (especially in the aggregate) have a "high entropy," meaning that given a random sample of individuals, it would be difficult to guess a particular individual's preference for a particular item, whether statistically, or based on knowledge of basic demographic or other information about an individual that can readily be obtained (e.g., through data-mining of publicly available information). Examples of items with low entropy in their corresponding user preferences include items such as "vacation" and "money" as likes and "being sick" and "pain" as dislikes. Conversely, "seafood," "going to the opera," and "horror movies" are examples of items with high entropy in their corresponding user preferences.

The following are examples of items for which a given user's are unlikely to be guessed by a third party, but are also likely to be remembered by that user.

In the "TV" category, users may select among different types of shows such as: reality shows, news, sports, sitcoms, dramas, movies, soap operas, game shows, and documentaries.

In the "food" category, users may select among different types of food such as: American, Barbecue, Cajun/Southern, California-Fusion, Caribbean/Cuban, Chinese/Dim Sum, Continental, Deli, Eastern-European, Fast Food/Pizza, French, German, Indian, Italian, Japanese/Sushi, Jewish/Kosher, Korean, Mediterranean, Mexican, Middle Eastern, Seafood, Soul Food, South American, Southwestern, Spanish, Thai, Vegetarian/Organic, Vegan, Vietnamese.

In the "Music" category, users may select among different styles of music such as: Acoustic, Alternative, Big Band/Swing, Blues, Christian & Gospel, Classic Rock n' Roll, Classical, Country, Dance/Electronica, Disco, Easy Listening, Folk, Hard Rock & Metal, Indie, Instrumental, Jazz, Latin, Modern Rock n' Roll, New Age, Oldies, Opera, Pop/Top 40, Punk, Rap/Hip Hop, Reggae, Show tunes, Soul/R&B, Soundtracks, World Music/Ethnic.

In the "Places" and "Activities" categories, users may select among going to different types of places/events: Amusement Parks, Antique Stores, Art Galleries, Bars/Nightclubs, Beach, Bookstores, Charity Events, Circuit Parties, Coffee Houses, Comedy Clubs, Concerts, Dance Clubs, Flea Markets, Garage Sales, Karaoke/Sing-along, Libraries, Live Theater, Movies, Museums, Opera, Parks, Political Events, Raves/Parties, Restaurants, Shopping Malls, Skate/Bike Parks, Sporting Events, Symphony, Volunteer Events.

In the "Sports" category, users may select among different types of activities: Aerobics, Auto racing/Motocross, Baseball, Basketball, Billiards/Pool, Cycling, Dancing, Football, Golf, Hockey, Inline skating, Martial arts, Running, Skiing, Soccer, Swimming, Tennis/Racquet sports, Volleyball. Walking/Hiking, Weights/Machines, Yoga.

The aforementioned categories and items are examples of things for which a user's preference can be sought. In some cases, some preferences (e.g., "I like Italian food" and "I don't like onions") are observable, such as by family members and coworkers. Some "likes" can also leave traces (e.g., a record of a purchase of a CD of a given type). However, "dislikes" are typically less likely to leave traces that can be mined. Additionally, very few third parties will be able to observe a specific individual's preferences for items across multiple categories. For example, while a co-worker might observe Alice's preference for Italian food, the co-worker is less likely to know that Alice likes visiting comedy clubs, dislikes Karaoke, and reads romance novels (or all of that information collectively). In various embodiments, the number of likes and dislikes that a user such as Alice must supply, and from how many different categories the preferred items are selected is configurable (e.g., by an administrator, based on one or more policies).

Additional formats may also be used to collect preference information. For example, rather than soliciting an answer of "like," "dislike," or "no opinion," in some embodiments the user is asked to perform a selection of more and less important events. For example, the following question is of that type: "Among the following sports, which one(s) do you prefer watching: auto racing, baseball, basketball, bowling, cricket, football, golf, hockey, soccer, ski jump, figure skating, tennis." A similar question can be posed to ask which ones the user does not like watching.

Yet another example of a technique for collecting user preferences is to provide a question that permits several simultaneous correct entries. For example, "Describe your personality by selecting one or more suitable descriptions: introvert, extrovert, peaceful, worrying, goal-oriented, impulsive, confrontational, shy, passionate." In this example, some of the pairs are in contradiction to each other, such as "introvert" and "extrovert," while others are roughly synonymous, such as "introvert" and "shy."

In addition to soliciting a user's preference for things, as previously mentioned system 102 can be configured to solicit other kinds of information about the user's life that are neither readily available through data mining, nor easily guessable. Examples include "do you sleep on the left side of the bed," "have you been to Chicago," "do you snore," etc. Different types of questions can also be mixed within an interface. For example, Alice may be asked to rate some items on a scale of 1-5, to select 4 likes and dislikes using an interface as is shown in FIG. 4, and may be presented with a list of life questions to be answered using a set of radio buttons at 202 in the process shown in FIG. 2.

Preferences can be captured (and later tested against) in a variety of ways. For example, in addition to answering written questions via website 112, preferences could also be captured acoustically (e.g., over the phone, via a series of voice prompts to which the user responds with a spoken "yes" or "no"). Similarly, the user could be played a set of audio clips and asked whether they like or dislike the sample. Other non-text entry methods can also be used, as applicable, such as devices used by the physically disabled.

Figure 5:
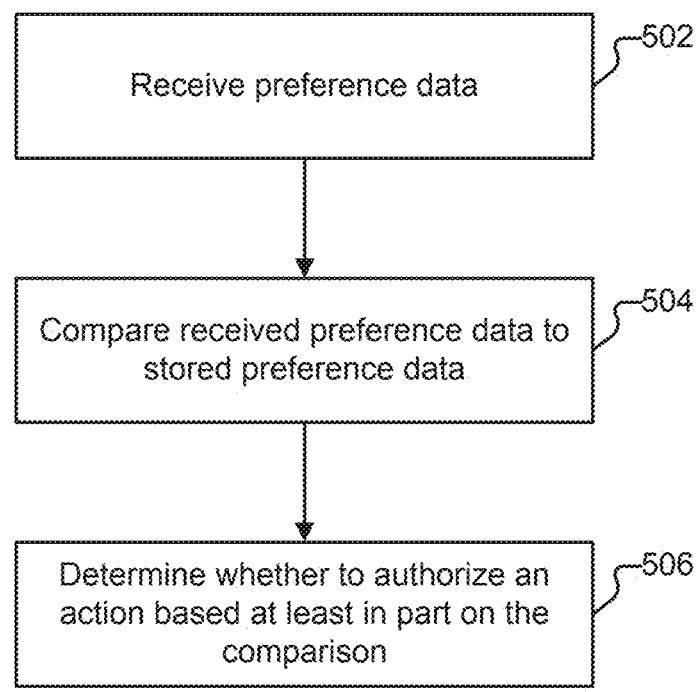
FIG. 5 is a flow chart illustrating an embodiment of an authentication process.

FIG. 5 is a flow chart illustrating an embodiment of an authentication process. In various embodiments, the process shown in FIG. 5 is performed by system 102. The process begins at 502 when preference data is received, such as from a user. The received preference data is received either as a selection of items (e.g., by the user having selected radio buttons, checkboxes, etc.), as a classification of items (e.g., by indicating a preference for a presented item on a sliding scale, a preference for one item over another, a ranking of presented items, etc.), or a combination thereof (collectively referred to herein as a "selection" of preference data). At 504, the received preference data is compared to stored preference data. At 506 it is determined whether an action should be authorized based at least in part on the comparison.

FIG. 6 illustrates an embodiment of an interface for authenticating a user. In some embodiments the interface shown in FIG. 6 is used in conjunction with the process shown in FIG. 6. Suppose Alice, after registering with website 112 (and providing preference information via the interface shown in FIG. 4) stops using online banking for a period of time. She eventually forgets her password. To resume using the features of website 112, Alice must reset her password. Alice visits website 112 and selects an "I forgot my password" option from the appropriate location on the site. Alice is then presented with interface 600. In the example shown, Alice is requested to provide preference information for each of the items shown in interface 600. After selecting the appropriate radio buttons, she clicks "done" and the preference information is submitted to system 102 (502), If Alice makes a mistake, she can "reset" the radio buttons as needed. The items shown in interface 600 need not exactly correspond to the items for which Alice previously provided preference information. For example, if Alice used the interface shown in FIG. 3A to enroll her preferences, only a subset of the items might be shown in interface 600. What percentage of items to show in interface 600 (and what mix of likes, dislikes, whether neutral items should be included, etc.) is customizable, e.g., based on policies specified by an administrator.

In some cases, a designated portion of the items shown in FIG. 6 are new. For example, Alice may have provided preference information for 75% of the items shown in interface 600. Her responses to those items will be used in the authentication process. The remaining 25% of questions may be used to augment Alice's existing preference information (e.g., by learning new information about Alice), may be used to test the entropy of questions for future use, and/or may be used for other purposes. By adding new questions and by providing only a portion of all registered questions, an attacker may have a more difficult time guessing which questions are associated with Alice, and have a harder time attempting to obtain the correct answers to the questions to be asked in a future authentication session.

Comparing Received Preferences to Stored Preferences

A variety of techniques can be used to store and subsequently compare stored preferences (e.g., those received from Alice at enrollment) to subsequently received preferences (e.g., received through interface 600). For example, suppose system 102 makes use of the interface shown in FIG. 3A. In that scenario, system 102 makes use of a total of 120 different things (also referred to herein as "questions"), notated individually as $q_i$, where i is a value from 1 to 120. Each question $q_i$ can be associated with a directed graph gi with di vertices. If there is a directed edge from vertex $v_{ij}$ to vertex $v_{ik}$, then an entry $w_{ijk}$ in an adjacency matrix A associated with the graph is set to a pre-set value $y_{ijk}$; if there is no such edge then the associated entry is set at a value T (e.g., negative infinity).

During the process shown in FIG. 2, the user is requested to answer each question $q_i$. An answer corresponds to selection of one or more of the vertices associated with this question. A selected vertex is associated with the value 1, while a vertex that is not selected is associated with the value 0. A variable $u_{ij}$ is used to record these values—$u_{ij}$ is set to 1 (resp. 0) if the vertex $v_{ij}$ is (resp. is not) selected in this process. The value U, which is specific to the given user, consists of the entire list of recorded values $u_{ij}$ for this user. The value U is stored by system 102. If the user doesn't answer certain questions (and/or has "no opinion"), such questions can be thought of as questions for which none of the vertices are selected.

In some embodiments, the preferences supplied at 204 in the process shown in FIG. 2 are evaluated to determine whether the enrollment is successful. For example, if the user answers all questions "yes," all questions "no," or leaves all questions as "no opinion," a problem may be indicated. One way of determining whether an enrollment attempt should be deemed successful is as follows. The sum of all (wij*ujj) is computed, for 0<i, j<n+1, where n is the number of questions (e.g., 120). This sum is denoted S1. If S1 is greater than some pre-set threshold value t1, then enrollment is considered successful, otherwise not. If the enrollment is not considered successful, then the value U is erased, and the user has to start over.

When an authentication is attempted (e.g., when Alice wishes to reset her password), system 102 retrieves the associated value U. Then, the user is requested to answer questions $q_i$. An answer (502) corresponds to selection of one or more of the vertices associated with this question. A selected vertex is associated with the value 1, while a vertex that is not selected is associated with the value 0. A variable $z_{ij}$ is used to record these values; thus, $z_{ij}$ is set to 1 (resp. 0) if the vertex $v_{ij}$ is (resp. is not) selected in this process.

To determine whether a given authentication attempt should be considered successful, the following is performed at 504: The sum of all $(w_{ijk} * u_{ij} * z_{ik})$ is computed, for $0 < i, j, k \leq n+1$. This sum is denoted S2. At 506, it is determined whether S2 is greater than some pre-set threshold value t2. If so, authentication is considered successful, otherwise not.

The value $y_{ijk}$ is the "benefit" of selecting outcome j for question i during enrollment, and then subsequently selecting outcome k for question k during authentication. A low value, such as the value T, can be used as a "punishment" for answering a question incorrectly, whereas a higher value is to be interpreted as a reward for answering the question correctly.

NUMERICAL EXAMPLE

Suppose q1="Do you like cats?" with three possible answers "yes", "neutral," and "no." These possible answers correspond to three nodes $v_{11}$, $v_{12}$, and $v_{13}$. All values $u_{11}$, $u_{12}$, and $u_{13}$ are set to 0. If the user selects that he likes cats, then the value un is set to 1; if he has no strong opinion, then $u_{12}$ is set to 1; and if he does not like cats, $u_{13}$ is set to 1.

Additional constraint values are $y_{111}=3$, $y_{112}=-5$, $y_{113}=T$, $y_{121}=0$, $y_{122}=0$, $y_{123}=0$, $y_{131}=T$, $y_{132}=-6$, and $y_{133}=4$.

When the user attempts to authenticate, the values $z_{11}$, $z_{12}$, and $z_{13}$ are set. The nine combinations of preferences during enrollment vs. authentication are as follows:

(LIKE,LIKE): S2=$y_{111}$=3
(LIKE,NO OPINION): S2=$y_{112}$=−5
(LIKE,DISLIKE): S2-$y_{113}$=T
(NO OPINION, LIKE): S2=$y_{121}$=0
(NO OPINION, NO OPINION): S2=$y_{122}$=0
(NO OPINION, DISLIKE): S2=$y_{123}$=0
(DISLIKE,LIKE): S2=$y_{131}$=T
(DISLIKE,NO OPINION): S2-$y_{132}$=−6
(DISLIKE,DISLIKE): S2-$y_{133}$=4

Thus, if the user first says he likes cats (during enrollment), and later says he does not during authentication, then the sum S2 becomes minus infinity. The same thing happens if he says that he dislikes cats during enrollment, and later says he likes them. (In various embodiments, the punishment is set to a value of much smaller absolute value. For example, while a correct answer may give 5 points, an incorrect answer may cause the loss of 20 points.) However, if he has no opinion during enrollment, then his answer during authentication always results in the sum S2=0. If he has an opinion during enrollment, and no strong opinion during authentication, the sum is set to a small negative value. If the user retains his like or dislike from enrollment to authentication, S2 is a positive number.

The assignment of low absolute weights allows for the later cancellation of incorrect answers to questions that the user has no strong opinion of (e.g., the types of questions where temporal variance is going to be the greatest). The assignment of large negative weights introduce strong negative feedback for questions where users have a strong opinion, but where the answer during authentication is incorrect. The assignment of positive weights allow for the detection of correct answers given during authentication. The assignment of low absolute weights reduces the impact of a small number of incorrect answers during authentication, where the incorrect answers are not contradictory with the users previously stated opinion, but merely not in complete agreement with these.

As multiple questions are considered, the sum S2 corresponds to the cumulative value of all these contributions from the different questions. A sum that is greater than the set threshold t2 means that the user answered in a similar-enough manner during authentication as he did during enrollment. In some embodiments if the sum is not greater than this threshold, then the user either mistook a strong like for a strong dislike (which is unlikely) or vice versa; stated that he had no strong opinion in the authentication phase for a sufficient number of questions he stated a strong opinion for in the enrollment phase, or a combination. The threshold t2 of the authentication phase, and the values $y_{ijk}$ are set in a manner that balances the risk for false positives with the risk for false negatives, and reflects the degree to which the answers to these questions are estimated to be maintained over time in some embodiments. The threshold t1 of the enrollment phase is set to guarantee a sufficient number of answers that are not "no strong opinion," in turn making it impossible to authenticate by answering "no opinion" to all or too many questions. In some embodiments, several values t2 are used (e.g., one for each type of access right), out of some collection of possible values and types of account access and privileges. The value t2 can be a function of the value t1, and of some minimum value required for access, as well as of other parameters describing the user and his or her risk profile.

Questions with more than three possible answers, such as degrees of opinion, and questions that have only two possible answers, and any type of question with multiple answers can be scored by adapting the techniques described herein.

In some embodiments instead of assigning the variable $y_{ijk}$ an arbitrary value describing the associated reward or punishment, a set of values representing $y_{ijk}$ can be selected and saved. Each such value will be a point in a two-dimensional space, with an x-coordinate and a y-coordinate. For practical purposes, we will assume that all the x-coordinates are distinct, and that all coordinates are represented by integer values in a given range from 0 to p, where p is a system parameter. Associated with each user is a random polynomial f(x) described with random integer parameters in the same range, 0 to p, and where the polynomial is evaluated modulo p.

For an instance $y_{ijk}$ with a large positive value, a large number of points on the curve f(x) are selected and associated with the indices i and k; for a large negative value, a small number of such points are selected; and for a value $y_{ijk}$ inbetween, an intermediary number of such points are selected. The exact mapping between values of $y_{ijk}$ and the number of selected points on the curve f(x) is a system parameter that can be customized to minimize false positives and false negatives. The variable $R_{ik}$ is used to denote the collection of points associated with $y_{ijk}$, where a large number of points from f(x) is selected if $y_{ijk}$ is large, and a smaller number of points from f(x) are selected if $y_{ijk}$ is small. Once a number of points on f(x) has been selected, these are stored in the record $R_{ik}$, along with random points on a random polynomial f'(x) to fill up those positions that do not contain f(x) values, up to a given maximum number of values that is a system parameter. Here, f'(x) has the same or larger degree than f(x), or corresponds to a random selection of points from the appropriate space. If for each value $y_{ijk}$ ten points in $R_{ik}$ are stored, then a high $y_{ijk}$ value could be represented by ten points from f(x); a value $y_{ijk}$ close to zero could be represented by eight values from f(x) and two values from f'(x); and the value T could be represented by ten values from f'(x). The ordering of values from f(x) and f'(x) as they are stored in $R_{ik}$ would be random or pseudo-random, and not disclosed.

Each value $y_{ijk}$ would be represented in this manner. The matrix of all values $R_{ik}$ would be saved. This takes the place of the previously defined value U.

In the above example, the degree of the polynomial f(x) may be chosen as n*10-1. This means that, for reconstruction of the polynomial f(x) from recorded points, it is necessary to know n*10 points on the curve. The degree of f(x) could, more generally, be chosen as n*L-1-d, where L is the number of points stored per record $R_{ik}$, and d is an integer value regulating the balance between false positives and false negatives, and corresponds to the total number of values from f' (x) that can be selected as all questions are answered, while still passing the authentication phase.

During the authentication phase, the user selects answers. For each such answer, he selects an associated collection of points, in turn associated with the values i (of the question) and k (of the response to the question). During authentication, the machine used by the user does not know what elements are from f(x) and what elements are from f'(x). However, if a selection is made for which $R_{ik}$ has a large portion of values from f'(x), then it is unlikely that only points from f(x) are going to be selected, and therefore, unlikely that the polynomial f(x) can be reconstructed. If there is a failure, the machine can try another set of points corresponding to the same user selection. A large number of these can be tried. If more than a certain number, say 1000, are tried, then the login script can generate an error to the user and request that the user attempts to authenticate again. An attacker would not have to limit himself to 1000 attempts, but if he has a large number of incorrect selections, he is unlikely to ever be able to reconstruct the polynomial. A machine can determine whether a polynomial is correctly interpolated by trying to compute f(x) on an input value x given by the server. If this is done correctly, then the server will allow the client access, and call the authentication attempt successful. The machines would not have to communicate the values in the clear, but could do this over an encrypted channel, or the client machine may send a one-way function of the result f(x) for the requested value x. Since the server knows the polynomial f(x) as well as x, it can verify whether this is a correct value. It is also possible to use an f-value for a known x-coordinate, such as x=0, as a cryptographic key, provided this point on the curve is never chosen to be part of an entry $R_{jk}$. Thus, a user that answers a sufficient number of questions correctly would enable his computer to compute f(0) using standard interpolation techniques (and as described above), thereby deriving the key f(0); a computer that fails to compute f(0) would not be able to perform the associated cryptographic actions. Thus, users who fail to authenticate sufficiently well would cause their computer to be unable to perform such actions.

In various embodiments other techniques are used to score stored (and subsequently received) preferences. For example, the entropy of a particular question can be used as a weight that is used when computing S2. Thus, a question such as "do you sleep on the left side of the bed" may be inherently worth more points (based on its entropy) than a question such as "do you like ice cream." Special rules can also take into account answers—particularly to life questions—that wrong answer to which may cause an authentication attempt to fail irrespective of the other questions being answered correctly. For example, if Alice indicates that she has been to Chicago at enrollment, and then subsequently denies being there, such an event might indicate that an attacker is trying to impersonate Alice. Conversely, mechanisms can also be used to make sure that for questions the answers to which might evolve over time (e.g., fondness for certain foods considered to appeal only to adults, such as mushrooms and sushi) don't result in false negatives.

Policies

A variety of policies can be put in place based on the security and other needs of website 112 (or other appropriate electronic entity). For example, different users may have different personal thresholds for what will constitute a valid authentication and what will not, but certain global minimums can be applied simultaneously. Additionally, different actions can be taken based on factors such as by how much a threshold was exceeded. For example, in a banking context, several thresholds could be used in which if the highest threshold is exceeded, the user is permitted full access to his or her account. If the second highest threshold is exceeded, the user is permitted full access to the account, but a flag is set alerting an administrator to review the user's account once the user logs off. Other lower thresholds can also be set with their own corresponding set of permitted actions, such as allowing the user read-only access to the account, informing the user that access will only be granted after any additional step is performed (e.g., requiring the user to make or receive a phone call, a respond to a piece of email, etc.).

Policies can also be used to specify, e.g., how many likes/dislikes a user must supply, whether (e.g., in the case of the interface shown in FIG. 4) items from multiple categories must be selected, and if so, from how many categories. If a large pool of items are available for users to indicate preferences for, in some embodiments the selection of which items a user is asked to provide prefaces for is randomized and/or the interface used for authentication is randomized. Policies can also be used to specify whether—if only one or two questions are answered incorrectly during authentication—the stored preference information should be updated to reflect the discrepancy. For example, in some embodiments if a user indicates a liking for a single food that was not previously liked, and does so multiple times, the preference information for that item for that user will be updated automatically to reflect the user's new preference. In various embodiments users, upon successful authentication, can initiate an "update" process in which they are permitted to repeat the process shown in FIG. 2 to update preferences.

Additional information, such as the presence or absence of a cookie, can be use to adjust thresholds (and permitted actions/levels of access) accordingly. As another example, suppose Alice's phone 116 includes a GPS. In some embodiments a side channel may be used to capture Alice's location information and to present Alice (e.g. in interface 600) with a question that asks if she was in <location> last week. Alice's GPS coordinates can also be used to determine the selection of the threshold required to pass authentication: a person attempting to authenticate from a location close to Alice's believed location (e.g., her home address, places she frequents, etc.) may be offered a lower threshold than a person who is distant from all likely GPS positions of Alice. In some embodiments, multiple types of additional information are used/combined. For example, if Alice's GPS reports that she is currently in California, but her alleged IP address reflects that she is in Romania, the threshold score needed to gain access to her account may be increased, and she may be required to supply a username and password, and also provide preferences whereas she might otherwise only be required to supply a correct username/password, etc.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method for utilizing a computer-readable tamper-evident log to manage an action to be performed by at least one computing device, the tamper-evident log accessible via at least one network interface that is communicatively coupled to a communications network, the method comprising:

before the action is allowed to be performed, appending information about the action to the tamper-evident log;

before the action is allowed to be performed, obtaining an attestation value associated with the action, the attestation value having been computed using a cryptographic digital signature function, the attestation value based at least in part on the information about the action; and upon appending the information about the action to the tamper-evident log, performing the action;

wherein, tampering of the tamper-evident log is detectable by performing a verification using the information about the action and the attestation value for the action.

2. The method of claim 1, further comprising, performing the action, the action comprising executing a script.

3. The method of claim 1, further comprising, upon verifying the action in the tamper-evident log, performing the action.

4. The method of claim 1, further comprising, computing the attestation value for the action.

5. The method of claim 1, further comprising, performing an authentication of the tamper-evident log using the information about the action and the attestation value of the action.

6. The method of claim 1, further comprising, authenticating the tamper-evident log using the information about the action and the attestation value of the action.

7. The method of claim 1, further comprising, detecting tampering of the tamper-evident log.

8. The method of claim 1, wherein, the attestation value was computed based, at least in part, on information that identifies a client.

9. The method of claim 1, wherein, the attestation value was computed based, at least in part, on a time and date.

10. The method of claim 1, wherein, the information about the action is associated with copyrighted material.

11. The method of claim 1, wherein, the attestation value was computed based, at least in part, on a nonce.

12. The method of claim 1, wherein, performing the action is associated with a state change being made.

13. The method of claim 1, wherein, the action is a transaction.

14. The method of claim 1, wherein, the action is an interaction.

* * * * *